United States Patent
Boyadzhiev et al.

(10) Patent No.: US 9,483,815 B2
(45) Date of Patent: Nov. 1, 2016

(54) SYSTEMS AND METHODS FOR COMPUTATIONAL LIGHTING

(71) Applicant: Cornell University, Ithaca, NY (US)

(72) Inventors: Ivaylo Boyadzhiev, Ithaca, NY (US); Kavita Bala, Ithaca, NY (US); Sylvain Paris, Jamaica Plain, MA (US)

(73) Assignee: Cornell University, Ithaca, NY (US)

( * ) Notice: Subject to any disclaimer, the term of this patent is extended or adjusted under 35 U.S.C. 154(b) by 41 days.

(21) Appl. No.: 14/522,425

(22) Filed: Oct. 23, 2014

(65) Prior Publication Data

US 2015/0109303 A1    Apr. 23, 2015

Related U.S. Application Data

(60) Provisional application No. 61/894,526, filed on Oct. 23, 2013.

(51) Int. Cl.
| | | |
|---|---|---|
| *G06T 15/50* | (2011.01) | |
| *G06T 15/60* | (2006.01) | |
| *G06T 5/50* | (2006.01) | |
| *G06T 11/60* | (2006.01) | |

(52) U.S. Cl.
CPC .............. *G06T 5/50* (2013.01); *G06T 11/60* (2013.01); *G06T 2200/21* (2013.01); *G06T 2207/20221* (2013.01)

(58) Field of Classification Search
None
See application file for complete search history.

(56) References Cited

U.S. PATENT DOCUMENTS

| | | | | |
|---|---|---|---|---|
| 7,876,321 | B2* | 1/2011 | Hsieh | H04N 13/026 345/419 |
| 8,687,883 | B2* | 4/2014 | Zheng | G06T 5/009 345/589 |
| 2006/0268149 | A1* | 11/2006 | Teng | H04N 5/243 348/362 |
| 2011/0040191 | A1* | 2/2011 | Kyle | A61N 5/015 600/473 |
| 2013/0063468 | A1* | 3/2013 | Hikida | G06T 7/0081 345/589 |
| 2013/0121612 | A1* | 5/2013 | Falco, Jr. | G06T 11/00 382/275 |
| 2014/0300600 | A1* | 10/2014 | Marks | G06K 9/4661 345/426 |

OTHER PUBLICATIONS

Debevec, et al., Acquiring the Reflectance Field of a Human Face, SIGGRAPH 2000 Conference Proceedings.
Tunwattanapong, et al., Interactive Lighting Manipulation Application on GPU, SIGGRAPH 2009, New Orleans, Louisiana, Aug. 3-7, 2009.
Adelson, E. et al., The plenoptic function and the elements of early vision. In Computational Models of Visual Processing, MIT Press.
Agarwala, et al., Interactive digital photomontage. 2004. ACM Trans. Graph.

(Continued)

*Primary Examiner* — Kee M Tung
*Assistant Examiner* — Frank Chen
(74) *Attorney, Agent, or Firm* — Valauskas Corder LLC

(57) ABSTRACT

A device for creating a digital image is described. The device that may receive two or more input images. The input images may have a common viewpoint with unique lighting configurations. The device may utilize basis light functions and modifiers to create a final composite image. The device may include a computing device configured to provide user a graphical user interface enabling a user to create a final composite image. Devices described herein may be useful for computational light workflows in photography.

17 Claims, 4 Drawing Sheets
(3 of 4 Drawing Sheet(s) Filed in Color)

(56) References Cited

OTHER PUBLICATIONS

Akers, D., et al., Conveying shape and features with image-based relighting. 2003. In Proceedings of the 14th IEEE Visualization 2003 (VIS'03), IEEE Computer Society.

Bishop, T., et al., The light field camera: Extended depth of field, aliasing and super-resolution. 2011. IEEE Trans. Pattern. Anal. Mach. Intel.

Bousseau, A., et al., User-assisted intrinsic images. 2009. ACM Trans. Graph. 28, 5 (Dec.).

Bousseau, A., et al., Optimizing environment maps for material depiction. 2011. InCGF, Eurographics Association, EGSR'11.

Boyadzhiev, I., et al., User-guided white balance for mixed lighting conditions. 2012. ACM Trans. Graph. 31, 6 (Nov.).

Burt, P. J., et al., A multiresolution spline with application to image mosaics. 1983. ACM Trans. Graph. 2, 4.

Carrol, R., et al., Illumination decomposition for material recoloring with consistent interreflections. 2011. ACM Trans. Graph. 30, 4 (Jul.).

Cohen, M., et al., Image stacks. 2003. Tech. rep., Microsoft Research. MSR-TR-2003-40.

Eiseman, E., et al., Flash photography enhancement via intrinsic relighting. 2004. ACM Trans. Graph. 23, 3.

Fattal, R., et al., Multiscale shape and detail enhancement from multi-light image collections. 2007. In ACM SIGGRAPH 2007 papers.

Guanzon, J., et al., Video of computational design workflow 2011. (https://http://vimeo.com/30363913). Tech. rep.

Hunter, F., et al., F. Light Science and Magic 4/e. 2011. Elsevier Science.

Judd, T., et al., Apparent ridges for line drawing. 2007. ACM Transactions on Graphics 26, 3.

Kelly, M., et al., Video of computational design workflow 2011. (https://www.youtube.com/watch?v=J-exuHchmSk). Tech. rep.

Levin, A., et al., Image and depth from a conventional camera with a coded aperture. 2007. In ACM SIGGRAPH 2007 papers, ACM.

Mallick, S. P., et al., Specularity removal in images and videos: a pde approach. 2006. In Proceedings of the 9th European conference on Computer Vision—vol. Part I, Springer-Verlag, ECCV'06.

Mertens, T., et al., Exposure fusion. In Proceedings of the 15th Pacific Conference on Computer Graphics and Applications, 2007. IEEE Computer Society.

Ng, R., et al., Light Field Photography with a Hand-Held Plenoptic Camera. 2005. Tech. rep., Apr.

Ostrovsky, Y., et al., Perceiving illumination inconsistencies in scenes. 2005. Perception 34.

Paris, S., et al., A fast approximation of the bilateral filter using a signal processing approach. 2009. International Journal of Computer Vision 81, 1.

Pellacini, F. et al., Envylight: an interface for editing natural illumination. 2010. ACM Trans. Graph. 29 (July).

Petschnigg, G., et al., Digital photography with flash and no-flash image pairs. 2004. In ACM SIGGRAPH 2004 Papers.

Raskar, R., et al., Non-photorealistic camera: depth edge detection and stylized rendering using multi-flash imaging. 2004. In ACM SIGGRAPH 2004 Papers, ACM, New York, NY, USA, SIGGRAPH '04.

Reinhard, E., et al., Calibrated image appearance reproduction. 2012. ACM Trans. Graph. 31, 6 (Nov.).

Schoeneman, C., et al., Painting with light. In Proceedings of the 20th annual conference on Computer graphics and interactive techniques, 1993. ACM, New York, NY, USA, SIGGRAPH '93.

Tan, R., et al., Separating reflection components based on chromaticity and noise analysis. 2004. IEEE Trans. Pattern. Anal. Mach. Intel.

Winnemoeller, H., et al., 2005. Light waving: Estimating light positions from photographs alone. 2005. Computer Graphics Forum 24, 3.

* cited by examiner

SYSTEMS AND METHODS FOR COMPUTATIONAL LIGHTING

This application claims the benefit of U.S. Provisional Application No. 61/894,526, filed on Oct. 23, 2013, which is incorporated by reference in its entirety.

GOVERNMENT SUPPORT

This invention was made with government support under grant NSF 1011919 awarded by National Science Foundation. The government has certain rights in the invention.

TECHNICAL FIELD

This disclosure relates to systems and methods for image processing and, more particularly, to systems and techniques for computational lighting.

BACKGROUND

A wide range of devices, including digital cameras, digital televisions, laptop or desktop computers, tablet computers, digital media players, cellular telephones, including so-called "smart phones," may be configured to capture and/or display digital images. Digital image devices may implement image processing techniques that enhance the appearance of a digital image. Image processing techniques may be implemented using photo-editing applications.

Current techniques for enhancing a digital image include creating a single digital image from a plurality of source images. For example, several source images of a single subject may be combined to create a single image of the subject. Current techniques for combining source images may be less than ideal.

SUMMARY

In general, this disclosure describes systems and techniques for image processing. In particular, the systems and techniques described herein may enable a photographer to create a desired image with respect to a particular scene. In one example, this disclosure describes a device that may enable a single image to be generated from a plurality of source images. In one example, a device such as a computing device, may be configured to enable a user to create a desired image using computational light techniques. In one example, a computing device may include a photo-editing application implementing the techniques described herein. The systems and techniques described herein may assist photographers in creating a compelling lighting environment for a scene.

According to one example of the disclosure, a method for creating a digital image, comprises receiving a plurality of input images, wherein each input image is taken from a fixed viewpoint with a different lighting configuration, selecting a linear combination of the plurality of input images to determine basis lights elements, and applying one or more basis light elements to one or more input images to create a digital image.

According to another example of the disclosure a device for creating a digital image, comprises one or more processors configured to receive a plurality of input images, wherein each input image is taken from a fixed viewpoint with a different lighting configuration, select a linear combination of the plurality of input images to determine basis lights elements, and apply one or more basis light elements to one or more input images to create a digital image.

According to another example of the disclosure a non-transitory computer-readable storage medium has instructions stored thereon that upon execution cause one or more processors of a device to receive a plurality of input images, wherein each input image is taken from a fixed viewpoint with a different lighting configuration, select a linear combination of the plurality of input images to determine basis lights elements, and apply one or more basis light elements to one or more input images to create a digital image.

According to another example of the disclosure an apparatus for creating a digital image comprises means for receiving a plurality of input images, wherein each input image is taken from a fixed viewpoint with a different lighting configuration, means for selecting a linear combination of the plurality of input images to determine basis lights elements, and means for applying one or more basis light elements to one or more input images to create a digital image.

The details of one or more examples are set forth in the accompanying drawings and the description below. Other features, objects, and advantages will be apparent from the description and drawings, and from the claims.

BRIEF DESCRIPTION OF DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
FIG. 1 is an example image generated using one or more of the techniques of this disclosure.

Lighting is a key component of photography, and may be considered on equal footing with other components of photography, such as, composition and content. That is, good lighting is important to the aesthetic quality of an image and can make the difference between a great picture and a discarded image. In many cases, photographers actively illuminate their subject with a variety of light sources to obtain a desired look. Lighting a scene using light sources may be a complex and challenging task. For example, positioning and setting the power of each flash may be a nontrivial and/or tedious task. Further, most lights are accompanied by modifiers that also need to be adjusted, e.g., a snoot to restrict the lit area, or a diffuser to soften shadows. In a traditional photography workflow, professional photographers work in a studio with many light sources carefully set up to produce desirable lighting with the goal of getting a near-final image at exposure time. In this workflow, typically, illumination is essentially left untouched during post-processing. It should be noted that while post-processing a captured image using a photo-editing application may be common, such post-processing typically has almost no effect on the lighting, which essentially remains the same as what was captured at exposure time. For example, traditional photo-editing applications for a single image typically include adjustments that brighten shadows and decrease highlights, but are limited to a specific effect such as white balance or shadow brightening and keep the spatial configuration unchanged, e.g., shadows cannot be altered.

Further, it should be noted that the notion of "good" lighting may be elusive and rely heavily on one's subjectivity. That is, different photographers may have different opinions on whether the lighting of a scene produced the desired atheistic effect. Under the traditional photography workflow, photographers may be limited in the manner in which they can modify illumination using current post-processing techniques. It should be noted that while techniques exist to edit lighting environments in the context of 3D rendering, such techniques typically require a full geometric description of a scene and may require total control over the light sources.

Recently, an alternative photography workflow has emerged. This alternative workflow may be referred to as computational lighting. Under a computational lighting workflow, photographers capture several images from a fixed viewpoint while varying lighting, e.g., moving/varying light sources to create several images of a scene having different illuminations. The plurality of captured images may then be processed/combined using image processing techniques to create a single image of the scene having a desired lighting effect. Unlike traditional photography workflows, where the goal is to capture a near-final image at the time of exposure, the capture session in the computational lighting workflow is not concerned with directly producing a visually pleasing image. A computational lighting capture session seeks to record useful data for post-processing. That is, each image captured during a computational lighting workflow may illuminate a portion of the scene in an interesting/unique way in order to be used later in combination with other images. Computational lighting workflows may be particularly useful for stationary subjects in time-constrained shots, e.g., subjects included in architectural and commercial (e.g., products) photography.

There may be several techniques for varying illumination in a computational lighting capture session with the main objective of each technique being to get good coverage of a scene i.e., each region of a scene having varying illuminations. An example technique for varying illumination may include moving a single flash to different locations between each shot. Techniques for creating lighting for a computational lighting capture session may have numerous advantages in terms of time, flexibility, cost, and mobility compared to techniques for creating lighting for a traditional capture session. That is, computational lighting capture sessions may be shorter, easier to set up, and require less equipment. For example, mobile flashes may be able to create sufficient lighting for a computational lighting capture session, whereas a studio with a complex manual lighting setup may be required for a traditional capture session.

In a computational lighting workflow, dozens to hundreds of images may be combined to create the final well-lit image. As such, a computational lighting workflow may permit considerable control, compared to a traditional workflow. Computational lighting may enable arbitrary layering and post-exposure adjustment over all the lights, allowing room for experimentation. For instance, the computational lighting workflow may enable a user to easily control a region affected by a light source with a mask and set its intensity with a brightness adjustment. In some cases, image processing techniques for combining dozens to hundreds of images from a capture session may primarily be a manual process. For example, a photographer may load all the images from a capture session as layers in a photo-editing application and carefully composite the images to produce a final image. In one example, to produce a final image for a scene, for each region of a scene, a photographer may select the desired appearance by editing the image alpha channels and ordering the layers appropriately. Further, in parallel to editing each region, each layer may be edited, for instance, to increase its brightness. Increasing brightness using a photo-editing application may be equivalent to having a more powerful light source at the time of exposure. Increasing brightness using a photo-editing application may have the advantages of instant feedback and the ability to undo modifications. In typical computational lighting techniques, only after all the adjustments and after combining the layers according to their alpha channels is the final image produced. In some cases, further editing may occur on the final image, for instance to remove unwanted elements.

Typical post-processing techniques for computational lighting workflows may be quite cumbersome even for experienced photographers. That is, for example, dealing with several tens of unorganized layers using a typical photo-editing application may be painstaking, requiring hours to days of manual effort, as well as advanced photo-editing skills. Further, when the number of images grows to several tens, or even above a hundred, navigating the corresponding layer stack may become impractical. In addition, with large scenes (e.g., a view of a room), most captured images may not be useful. For example, most captured images may show the main subject mostly in the dark with only a small part lit. Thus, finding the useful images in the stack, setting their relative intensities, and blending them together to get visually pleasing results may be a highly challenging task that requires advanced photography and image editing skills.

Debevec, P. et al., Acquiring the reflectance field of a human face. In Proceedings of ACM SIGGRAPH 2000, describes a computational lighting technique where a scene can be realistically relit under novel illumination conditions by treating the input images as a basis and fitting a lighting model per image pixel. However, the technique described in Debevec needs to know the position of the light source in each image, which requires specialized acquisition equipment. Further, the technique described in Devevec and other conventional computational lighting techniques may not be suitable for large scale architectural scenes. In other computation lighting techniques a photo-editing application may allow users mark the regions of interest in the input images and an algorithm may attempt to produce a satisfying composite. Such composites may be less than satisfying and may require significant manual editing. Further, while these techniques may work reasonably well when there are only a few input photos, these techniques may become inefficient/inoperable when there are hundreds of input photos. With such datasets, deciding which images to use, and which parts in them to combine, is a major challenge that is as difficult as producing the actual combination. Other conventional algorithms that attempt to produce a satisfying composite may only offer a user a few presets and give the user limited editing capabilities. Other computational lighting techniques may not effectively handle the more diverse lighting configurations of the computational lighting workflow.

This disclosure described techniques that may make compositing an image from tens to hundreds of source images easier and more efficient. FIG. 1 is an example image using one or more of the techniques of this disclosure. The image in FIG. 1 is an example of a composited image that may be generated from a plurality of source images using one or more of the techniques described herein. This disclosure describes a set of optimizations that may assemble a plurality of source images to create a few basis lights that correspond to common goals pursued by photographers. For example, basis lights created using the techniques described herein may achieve specific effects like accentuating edges, enhancing the material color of an object, or adding fill light. In one example, the techniques described herein further introduce modifiers that affect the basis lights. Example modifiers may capture standard photographic tasks. For example, modifiers described herein may alter the basis lights to soften highlights and shadows, akin to umbrellas and soft boxes. Example, modifiers described herein may achieve effects similar to standard lighting equipment, such as soft boxes to soften highlights and shadows, and snoots to restrict the light extent. It should be noted that example basis lights and modifiers described herein were designed, at least in part, by reasoning entirely in image space, thereby avoiding a computationally expensive, and potentially brittle 3D reconstruction of the scene.

In one example, the example techniques described herein may be implemented with a computational capture session using a single flash without know the light positions. Further, the example techniques described herein may be implemented using a graphical user interface that enables a user to create a composite from tens to hundreds of source images from a computational light capture session. As described in more detail below, a study of one example graphical user interface demonstrated that the techniques described herein may enable novice and professional photographers alike to efficiently create satisfying results. Further, casual users particularly benefit from the techniques described herein, at least, because coping with a large number of layers using current techniques is daunting and requires significant experience. The study is described in Ivaylo Boyadzhiev, Sylvain Paris, Kavita Bala, User-assisted image compositing for photographic lighting, ACM Transactions on Graphics (TOG), v.32 n.4, July 2013 (hereinafter "Boyadzhiev"), which is incorporated by reference is its entirety. Boyadzhiev evaluates example techniques described herein on several test cases demonstrating that that one or more of the techniques described herein may enable the design of sophisticated lighting environments with a small set of meaningful degrees of freedom, instead of a complex physical setup or the tedious manipulation of tens of layers. Boyadzhiev further demonstrates the ease of lighting for novices and professionals using our basis lights in an example workflow.

Figure 2:
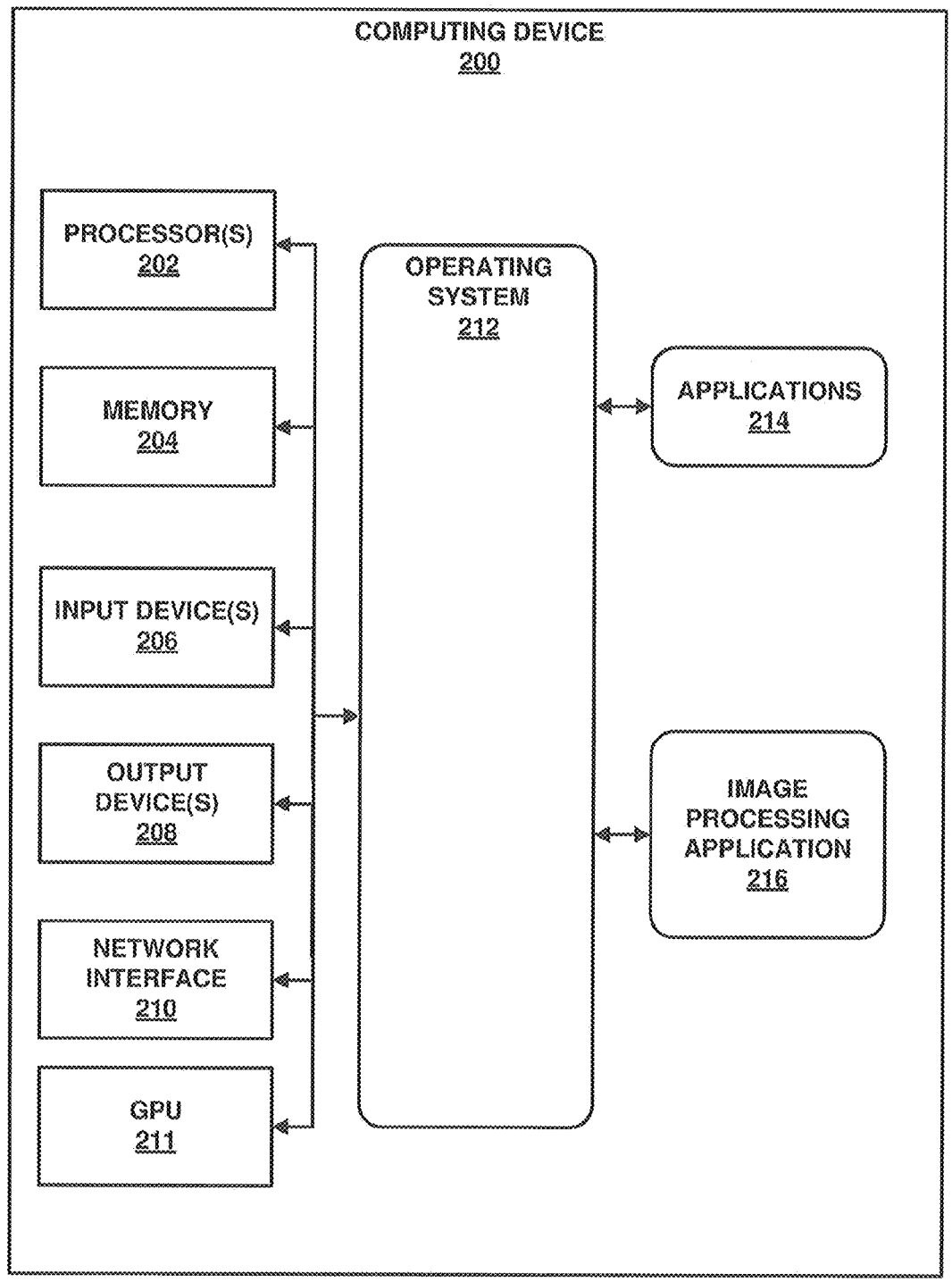
FIG. 2 is a block diagram illustrating an example of a computing device that may implement one or more techniques of this disclosure.

FIG. 2 is a block diagram illustrating an example of a computing device that may implement one or more techniques of this disclosure. Computing device 200 is an example of a computing device that may execute one or more applications, including image processing application 216. Computing device 200 may include or be part of a portable computing device (e.g., a digital camera, a mobile phone, netbook, laptop, or tablet device) or a stationary computer (e.g., a desktop computer). Computing device 200 includes processor(s) 202, memory 204, input device(s) 206, output device(s) 208, network interface 210, and graphics processing unit 211.

Each of processor(s) 202, memory 204, input device(s) 206, output device(s) 208, network interface 210, and graphics processing unit 211 may be interconnected (physically, communicatively, and/or operatively) for inter-component communications. Operating system 212, applications 214, and image processing application 216 may be executable by computing device 200. It should be noted that although example computing device 200 is illustrated as having distinct functional blocks, such an illustration is for descriptive purposes and does not limit computing device 200 to a particular hardware architecture. Functions of computing device 200 may be realized using any combination of hardware, firmware and/or software implementations.

Processor(s) 202 may be configured to implement functionality and/or process instructions for execution in computing device 200. Processor(s) 202 may be capable of retrieving and processing instructions, code, and/or data structures for implementing one or more of the techniques described herein. Instructions may be stored on a computer readable medium, such as memory 204. Processor(s) 202 may be digital signal processors (DSPs), general purpose microprocessors, application specific integrated circuits (ASICs), field programmable logic arrays (FPGAs), or other equivalent integrated or discrete logic circuitry.

Memory 204 may be configured to store information that may be used by computing device 200 during operation. As described above, memory 204 may be used to store program instructions for execution by processor(s) 202 and may be used by software or applications running on computing device 200 to temporarily store information during program execution. For example, memory 204 may store instructions associated with operating system 212, applications 214, and image processing application 216 or components thereof, and/or memory 204 may store information associated with the execution of operating system 212, applications 214, and image processing application 216. For example, memory 204 may store source images associated with a computational lighting capture session (e.g., hundreds of images captured from a single viewpoint).

Memory 204 may be described as a non-transitory or tangible computer-readable storage medium. In some examples, memory 204 may provide temporary memory and/or long-term storage. In some examples, memory 204 or portions thereof may be described as volatile memory, i.e., in some cases memory 204 may not maintain stored contents when computing device 200 is powered down. Examples of volatile memories include random access memories (RAM), dynamic random access memories (DRAM), and static random access memories (SRAM). In some examples, memory 204 or portions thereof may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories.

Input device(s) 206 may be configured to receive input from a user operating computing device 200. Input from a user may be generated as part of a user running one or more software applications, such as image processing application 216. Input device(s) 206 may include a touch-sensitive screen, track pad, track point, mouse, a keyboard, a microphone, a camera, video camera, or any other type of device configured to receive input from a user. In the example, where computing device includes a digital camera, input device(s) 206 may include an image sensor (e.g., a charge coupled device (CCD) or a complementary metal-oxide-semiconductor (CMOS) sensor).

Output device(s) 208 may be configured to provide output to a user operating computing device 200. Output may tactile, audio, or visual output generated as part of a user running one or more software applications, such as applications 214 and/or image processing application 216. Output device(s) 208 may include a touch-sensitive screen, sound card, a video graphics adapter card, or any other type of device for converting a signal into an appropriate form understandable to humans or machines. Additional examples of an output device(s) 208 may include a speaker, a cathode ray tube (CRT) monitor, a liquid crystal display (LCD), or any other type of device that can provide output to a user.

Network interface 210 may be configured to enable computing device 200 to communicate with external devices via one or more networks. Network interface 210 may be a network interface card, such as an Ethernet card, an optical transceiver, a radio frequency transceiver, or any other type of device that can send and receive information. Network interface 210 may be configured to operate according to one or more communication protocols. In the example, where computing device 200 includes a laptop, desktop, or tablet computer, computing device 200 may receive digital images associated with a computational lighting capture session using network interface 210.

Graphics processing unit 211 may be configured to provide dedicated graphics processing for computing device 200. Graphics processing unit 211 may be configured to receive commands and data and output pixel data. Graphics processing unit 211 may include multiple processing cores. Graphics processing unit 211 may be configured to operate according to OpenGL and/or Direct3D. Graphics processing unit 211 may operate according to a graphics pipeline process (e.g., input assembler, vertex shader, geometry shader, rasterizer, pixel shader, and output merger).

Operating system 212 may be configured facilitate the interaction of applications, such as applications 214 and image processing application 216, with processor(s) 202, memory 204, input device(s) 206, output device(s) 208, network interface 210 and other hardware components of computing device 200. Operating system 212 may be an operating system designed to be installed on laptops and desktops. For example, operating system 212 may be a Windows operating system, Linux, or Mac OS. In another example, if computing device 200 is a mobile device, such as a smartphone or a tablet, operating system 212 may be one of Android, iOS or a Windows mobile operating system.

Applications 214 may be any applications implemented within or executed by computing device 200 and may be implemented or contained within, operable by, executed by, and/or be operatively/communicatively coupled to components of computing device 200, e.g., processor(s) 202, memory 204, and network interface 210. Applications 214 may include instructions that may cause processor(s) 202 of computing device 200 to perform particular functions. Applications 214 may include algorithms which are expressed in computer programming statements, such as, for loops, while-loops, if-statements, do-loops, etc. Applications may be developed using a programming language. Examples of programming languages include Hypertext Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Perl, Python, UNIX Shell, Matlab, Visual Basic or Visual Basic Script, Virtual Reality Markup Language (VRML), ColdFusion™ and other compilers, assemblers, and interpreters.

As described above, typical post-processing techniques for computational lighting workflows (e.g., dealing with several tens of unorganized layers using a typical photo-editing applications) may be quite cumbersome even for experienced photographers. Image processing application 216 is an example of an application that may implement the techniques described herein in order to create a final image from a plurality of images associated with a computational light capture session. In one example, image processing application 216 may be configured to enable users to create a final image using a similar approach to that of an approach that photographers use in a typical workflow.

In one example, image processing application 216 may be implemented using a combination of C++ and Matlab. In one example, the component that optimizes the basis lights is an offline process, which is implemented in Matlab, since it was less time critical. Further, Matlab may be used to solve the constrained linear and non-linear optimizations problems that correspond to our basis-light objectives. The timing for this step depends on the size of the regions, but, in one example, it may take from a few seconds up to 10 minutes, when the region is the whole image. However, this offline process can be done in parallel for all pre-segmented objects and basis lights.

Although there are many ways to illuminate a scene in photography, there are recurring trends among professionals photographers in regard to how they think of lighting. Professional photographers typically think of lighting as the discrete combination of a few standard configurations. For instance, key light illuminates the main subject, and fill light is aimed at shadows to control how dark they are. While the exact setups depend on each photographer and scene, decomposing illumination into a small number of objectives is a standard practice. Professional photographers typically identify a few important geometric features of a scene that they seek to accentuate in the final result. These features are typically occluding contours that separate two objects at different depth, surface discontinuities such as creases, and curved regions that are characteristic of the object's shape. To emphasize these features, photographers may set up illumination so that a highlight falls on one side of an object and a shadow on the other. Photographers seek what is referred to as "good light." While the concept of good light may be elusive, a few properties stand out among professional photographers. Harsh highlights and hard shadow boundaries are undesirable, because they tend to distract from the scene. Overly dark shadows are also to be avoided because they hide the scene content. In one example, image processing application 216 includes options to mimic photographers' solutions to these issues.

In one example, image processing application 216 may be configured to receive input data. Then, building upon observations about the types of lights used, and lighting practices, image processing application 216 may provide a set of basis light sources and controls that assist users in achieving powerful effects. In one example, image processing application 216 includes a set of basis lights, which relate to standard photography practices. Some of these lights may correspond to actual lighting scenarios, commonly used in photography. In one example, image processing application 216 includes the following three basis lights: fill, edge, and diffuse color. In one example, image processing application 216 may find basis lights through an optimization scheme that looks for the best linear combination of the input images, such that a certain objective is minimized.

Fill light corresponds to physical light sources used by photographers and may address the objective of directly controlling shadows, i.e., how dark they are. In one example, image processing application 216 includes a fill light function to control the darkness of the shadows, and enables users to restrict the extent of a light, which can be useful to prevent undesirable highlights and shadows. In one example, a fill light function may enable a user to simulate area light sources with several point sources to soften the highlight and shadows. Edge light may address the objective of emphasizing edges and curved areas. In one example, image processing application 216 includes an edge light function that emphasizes edges and curved regions in the scene. In one example, to help users accentuate scene edges and curved regions, edge light function analyzes source images to identify these features and then uses an energy function that favors high contrast around them. Diffuse color light may address the objective of revealing the diffuse color of an object. In one example, image processing application 216 includes a diffuse color light function that emphasizes underlying colors. In one example, for each of the fill light, edge light, and diffuse color light functions an energy function may be formulated that models each of their respective objectives. For example, large gradients that align with the main scene features for the edge light function. In one example, minimizing the energy may provide a set of coefficients that are used to combine the input images.

In addition to including one or more of fill light function, edge light function, and diffuse color light function in one example, image processing application 216 may also include modifier controls to mimic the effects of standard light modifiers. For instance, in one example, input images may be embedded into a weighted graph based on their similarity and image processing application 216 may apply a diffusion process on this graph to modify a given set of coefficients to approximate the shadow-softening effect of an umbrella or a soft box. Other example modifiers controls include per-object and regional modifiers that enable a user to control the lighting for objects, like using a snoot, or to change the relative lighting of foreground versus background.

Image processing application 216 may be described with respect to the following definitions and notation. $I_i(p)$ may denote the RGB components of a pixel p in the $i^{th}$ input image. In the example described herein, image processing application 216 may work with sRGB values that are not gamma compressed, e.g., an inverse gamma correction may be applied by assuming 2.2 gamma. Intensity of a pixel may be referred to as: $\bar{I}_i(p)=dot(I_i(p), (0.2990, 0.5870, 0.1140))$, defined as a weighted average of its RGB channels. N may refer to the number of input images. $W=(1, 1, 1)^T$ may be used for the white color. Image processing application 216 may rely on angles between RGB vectors to reason about color saturation. The notation $\angle(C1,C2)=arcos(dot(C1/\|C1\|, C2/\|C2\|))$ may be used for the angle between the two colors C1 and C2. In several instances, a weighting function $w_i(p)=\bar{I}_i(p)/(\bar{I}_i(p)+\epsilon)$ that varies between 0 for low values of $\bar{I}_i(p)$ and 1 for high values may be used. This function may be useful to reduce the influence of dark pixels that are more noisy. In one example $\epsilon=0.01$ was used assuming that the RGB channels range between 0 and 1.

In one example, image processing application 216 may be configured to receive input data representing a few tens or more photos taken from a fixed viewpoint. As described above, each source image may have different lighting configurations. In one example, a set of photos may have been generated using a single flash light. In one example, a sample dataset may be acquired using a remotely triggered flash unit and moved to a different position after each shot, covering the entire scene in about 100 pictures. Although, this may be a rather mechanical process, such a dataset may provide good coverage of the whole scene, with no particular planning. For a single data set, such a capture session may take approximately 20 minutes. In one example, a camera may be placed on a tripod and the remotely triggered flash may be manually moved around. Further, exposure may be fixed so that the flash dominates the other lights. Depending on the type of scene, in one example, a few images with longer exposure may be taken.

It should be noted that in one example, image processing application 216 may be configured to process input data based on one or more assumptions. In one example, image processing application 216 may assume that the light sources are approximately uniformly distributed in the scene and that their power is approximately constant. Further, in one example, image processing application 216 may assume that the input set of images is white balanced with respect to the color of the flash light, i.e., the light source appears white in the input photos. In one example, image processing application 216 may perform pre-processing to remove unwanted artifacts that appear in a source image (e.g., a person walking in front of a building), so that those regions are not considered later.

As described above, image processing application 216 may include a fill light function. One role of fill light may be to provide ambient lighting that gives approximately even illumination everywhere. This is the light that illuminates the shadows, i.e., it controls how dark they are. In one example, image processing application 216 may assume that input lights are roughly uniformly distributed, and could use the average of all the input images, $$\frac{1}{N}\sum_i I_i.$$

However, since the light distribution is not perfectly uniform, the average may exhibit some large intensity variations. Image processing application 216 may improve over this simple average by giving more importance to bright pixels using the $w_i$ weights, which reduces the influence of dark noisy pixels. Equation 1 provides an example of a fill light function.

$$I_{fill}(p) = \frac{\sum_i w_i(p)I_i(p)\|}{\sum_i w_i(p)} \quad (1)$$

where i is the index over all images.

As described above, photographers often seek to emphasize the main edges and curved areas in the scene. A common approach is to position the lighting such that it creates a tonal variation around those regions of interest. In particular, highlights and shadows are among the main building blocks through which photographers achieve this. One role of edge light may be to assist photographer with this task. In one example, image processing application 216 may first analyze the input images to identify the features to accentuate, and then linearly combine the input images to emphasize the detected features with mixture coefficients being a solution to a defined optimization problem.

In one example, the features that are desired to emphasize as edges in the input images that look persistent under the changing lighting conditions are defined. Those can be due to geometric discontinuities in the scene, or more persistent highlights and shadows, which generate discontinuities in the observed images. However, occasional hard shadows and sharp highlights may also produce image discontinuities, but they are not of interest, since creating highlights and shadows that compete with the main features of a scene is something photographers try to avoid.

It should be noted that one of the key observation of an example approach to edge light is that main edges of the scene are always located at the same place in the image, whereas discontinuities due to occasional highlights and shadows move depending on where the light source is. By observing the statistics at a given location, image processing application 216 can differentiate between a persistent scene feature and ephemeral edges due to occasional illumination effects. The former appears consistently in all images while the latter is only present once or a few times, i.e., it is an outlier. The example approach described herein builds upon this observation and may use robust statistics to extract a map of the main scene features. It should be noted that a few options such as computing the robust max or the median gradient at each pixel were tested. However, it was found that the solution that described in the example described below performs better for the goal of emphasizing persistent edges.

In one example approach to edge light, image processing application 216 uses the fact that edges due to occasional highlights and shadows have an inconsistent orientation. To exploit this phenomenon, at each pixel, image processing application 216 may build a histogram of the gradient orientations. In one example, image processing application 216 may use bins that span 5°. To prevent dark noisy pixels from perturbing the process, the contribution of each pixel may be weighted using its weight, $w_i$. Also, to differentiate between flat regions and vertical edges, small gradients of magnitudes less than 0.001 may be handled separately. Then, within the largest bin, the gradient of maximum amplitude may be picked. Intuitively, this process selects the strongest gradient that aligns with the most persistent orientation at every pixel. This gives a target gradient map, G. In one example, image processing application 216 seeks the edge light as a linear combination of the input images: $I_{edge} = \Sigma_i \lambda i\, I_i$. To find the mixture coefficients $\lambda_i$, the following weighted least-squares energy function in Equation 2 may be minimized:

$$\mathrm{argmin}_{\{\lambda_i\}} \sum_p h(p) \left\| \nabla \left( \sum_i \lambda_i I_i(p) \right) - G(p) \right\|^2 \qquad (2)$$

where the per-pixel weights h(p) give more influence to pixels that have a peaked orientation histogram, that is, pixels that have a well-defined orientation. h may be defined by normalizing the histograms to 1 so that we can compare them across pixels, and picking the value of the largest bin at each pixel.

It should be noted that the effect of edge light is not necessarily to avoid all shadows and highlights, which would be undesirable from a photographic point of view. By optimizing for lighting that maximizes gradients that align with the main scene features, it favors highlights and shadows that align with them. This behavior is reminiscent of the line drawing techniques that motivate their approach by characterizing the lines worth drawing as the ones that appear across multiple lighting configurations. From this perspective, the example edge light function seeks to produce an image in which discontinuities would be a good line drawing of the scene.

As described above, image processing application 216 may include a diffuse color light function. In one example, an objective of the diffuse color light function may be to emphasize the base color of objects. In one example, to reason about scene colors, a simple diffuse plus specular image formation model may be used in which the diffuse color can be arbitrary, and the specular color may be the same as the light color. In considering the case of a colorful object, image processing application 216 may include an energy function that favors images in which the diffuse component is strong compared to the specular reflection. It may be observed that because the specular component is white, the stronger it is, the less saturated the observed color is. Formally, a pixel I=dD+sW may be considered, where D is the diffuse color and d its intensity, $W=(1, 1, 1)^T$ the white color, and s the specular intensity. The saturation may be characterized by the angle $\angle(I, W)$ between the observed color I and the white color W. For a fixed d value, this angle decreases when s increases. This may motivate the following energy term in Equation 3:

$$\mathrm{argmin}_{\{\lambda_i\}} \sum_p \hat{w}(p) \angle \left( \sum_i \lambda_i I_i(p),\, W \right) \qquad (3)$$

where $\hat{w}(p) = \Sigma_i \lambda i\, I_i(p)/(\Sigma_i \lambda i\, I_i(p) + \epsilon)$ is a term that prevents selection of linear combination of lights that produce dark pixels, that tend to be noisier.

With Equation 3, image processing application 216 may seek a linear combination of input images that maximizes the angle with the white color, while preventing the selection of dark pixels. This approach may work well for colorful objects, that is, when $\angle(D,W) \gg 0$. However, this term may be less effective for objects of neutral color, i.e., when $D \approx W$. For neutral colored objects, changes in specular intensity create only small angle variations. It should further be noted that the optimization may become sensitive to colored inter-reflections. For such neutral objects, even the small change of saturation generated by light reflecting off nearby colored objects may have a significant impact on the energy value. In experiments, using the energy term in Equation 3 alone produced images in which gray objects have strong colored inter-reflections, which looked unpleasant. This issue may be addressed with a second energy term based on the observation that the average image lowers the contribution of rare illumination effects, such as strong inter-reflections and highlights, which are undesirable features based on our diffuse color light definition. An example energy term that encourages similarity between the average image is provided in Equation 4:

$$\mathrm{argmin}_{\{\lambda_i\}} \sum_p \angle \left( \sum_i \lambda_i I_i,\, \frac{1}{N} \sum_i I_i \right) \qquad (4)$$

Since, in some cases, the term in Equation 4 may only be used for neutral colors, else the solution will tend towards the average, a balancing term may be used that equals 1 only for neutral colors and has lower values otherwise, an example balancing term is provided in Equation 5:

$$\alpha(p) = \exp\left( -\angle\left( \frac{1}{N} \sum_i I_i(p),\, W \right)^2 / 2\sigma^2 \right) \qquad (5)$$

with σ=0.5. Putting the two terms together, and realizing that the goal is to maximize Equation 3, but minimize Equation 4, the coefficients of the diffuse color light $I_{diffuse}$ may be obtained by minimizing Equation 6:

$$\text{argmin}_{\{\lambda_i\}} \sum_p \left[ \alpha(p) L\left( \sum_i \lambda_i I_i(p), \frac{1}{N} \sum_i I_i(p) \right) - (1 - \alpha(p)) \hat{w}(p) L\left( \sum_i \lambda_i I_i(p), W \right) \right] \quad (6)$$

In one example, this function may be minimized by using an interior point technique with finite differences to approximate the gradients. In this manner, image processing application 216 may include energy terms for each of the three basis lights: fill light, edge light and diffuse color lights. Image processing application 216 may solve for the linear combination of images, and their corresponding weights, that minimize the energy terms.

As described above, in addition to the basis lights described with respect to Equations 1-6, image processing application 216 may also include modifiers that alter the properties of these lights in ways that mimic standard practices in photography. Example modifiers may include a per-object lighting modifier, a regional lighting modifier, and a soft lighting modifier. The per-object lighting modifier may restrict the light's extent, the regional lighting modifier may balance the illumination intensity between different regions of the scene, and the soft lighting modifier may modify the lights so that they produce softer shadows and highlights.

In one example, the per-object lighting modifier may be inspired by equipment like snoots that photographers use to control the spread of lights. In one example, image processing application 216 may let users select objects in an image, then compute the fill, edge, and diffuse color lights as described above by considering the pixels within the selected object. Image processing application 216 may enable user to then locally mix these three lights, as described in further detail below with respect to FIG. 3 and FIG. 4. To ensure smooth blending with the rest of the image, a cross bilateral filter can be applied to the binary selection, using the intensities of the current result as the guiding image. In one example, the fast cross bilateral filtering by described in Paris et al. 2009, A fast approximation of the bilateral filter using a signal processing approach, *International Journal of Computer Vision* 81, 1, which is incorporated by reference in its entirety, may be used to transform the binary selection into weighting masks that respect the edges for each of the basis lights. After the fast cross bilateral filtering has been performed, image processing application 216 may approximate the weighting mask of the current combination of basis lights by linearly blending their corresponding masks. This produces a continuous mask that "snaps" at the main scene edges, which yields satisfying results. It should be noted that, simple Gaussian blur may also be used, but in experiments this generated severe halos. Further, multiscale blending may also be used, but in experiments this caused color artifacts to appear.

In one example, the soft light modifier aims for an effect akin to umbrellas and soft boxes. That is, simulating area light sources that produce soft shadows and highlights. In one example, image processing application 216 may approximate an area light source by a set of nearby point sources. However, in typical case, the position of the light sources is unknown a priori. In one example, this problem may be addressed with an approach inspired by Winnemoller et al. 2005. Light waving: Estimating light positions from photographs alone, *Computer Graphics Forum* 24, 3, which is incorporated by reference in its entirety, which showed that for two images taken from the same viewpoint with two different point lights, the spatial distance between the lights is correlated to the difference between the observed images: close light sources generate similar looking images and distant sources create different images. Winnemoller et al. demonstrates that this can be used to recover the positions of lights on a sphere. However, they mention that more general configurations are challenging.

In one example, the soft lighting modifier builds upon the same correlation between light position and image appearance, and sidesteps the difficulties stemming from general light configurations by directly modifying the light mixture coefficients without explicitly recovering the light positions. Soft light modifier may implicitly embed the input images into a weighted graph based on their similarity and apply a diffusion process on this graph to modify a given set of mixture coefficients $\{\lambda_i\}$ to approximate the effect of soft box lighting. A N×N matrix, S, with coefficients (Equation 7) may be defined:

$$S_{ij} = \exp(-\|I_i - I_j\|^2 / 2\sigma_s^2) \quad (7)$$

and a vector $\Lambda = (\lambda_1, \ldots, \lambda_N)^T$. Intuitively, multiplying $\Lambda$ by S spreads the contribution of each light to the nearby sources using the image similarity $\|I_i - I_j\|$ as a proxy for the spatial distance. The $\sigma_s$ parameter controls how far the intensity of each light is diffused. As is, this approach does not preserve the overall illumination intensity. A few options were experimented with and it was found that a simple global resealing works well and is computationally inexpensive. To summarize, an example soft lighting modifier may be defined by Equation 8:

$$\text{soft}_{\sigma_s}(\Lambda) = \frac{\|\Lambda\|}{\|S\Lambda\|} S\Lambda \quad (8)$$

To gain intuition with respect to the example soft lighting modifier described above, two extreme $\sigma_s$ settings may be observed. For $\sigma_s \to 0$, the modifier does nothing, as one would expect. That is, point light sources remain as is. For $\sigma_s \to \infty$, the output coefficients are all equal. That is, the output is the average of the input images, which is in some sense the largest area light that that can be simulated with an example data set. Other values of $\sigma_s$ provide approximations to area light sources of intermediate sizes. That is, applying the soft lighting modifier may soften the highlights and the shadow boundaries and keep the shadows dark.

Photographers carefully balance light intensities in a scene to either emphasize a specific region or to do the opposite. A regional lighting modifier may assist in this process. In one example, image processing application 216 may be configured to provide a simple way to balance the lighting across the scene at a coarse level. In one example, fine-grain adjustments can be made with the example per-object modifier described above. In one example, regional lighting modifier may be built on the observation is that the PCA (Principal Component Analysis) decomposition of the input images extracts the main modes of variation of the illumination. In particular, for scenes that can be decomposed into "regions" illuminated independently of each other, e.g., foreground versus background, or left versus right, the first PCA component captures this structure well.

Since PCA assumes an additive mode of variation, and light interaction with materials is multiplicative, image processing application 216 may work in the log domain. In one example, because regional lighting modifier may seek to only modulate pixel intensities without altering their color, image processing application may work with the intensity images $\{I_i\}$. Image processing application 216 may estimate the first PCA component P of the log intensities $\{\ln(I_i)\}$. To avoid perturbing the overall image intensity, enforce a zero mean onto P may be enforced by defining Equation 9:

$$\hat{P} = P - \frac{1}{N}\sum_p P(p) \qquad (9)$$

As is, $\hat{P}$ often exhibits undesirable shadow boundaries. The undesirable shadow bound may be removed by applying a cross bilateral filter (e.g., Paris et al.) to $\hat{P}$ with the current global result (a.k.a. the smooth blending of all locally and globally optimized basis lights) as the guiding image. A map M=exp($\beta\hat{P}$) may be created, where $\beta$ is a user parameter controlling the magnitude of the effect: $\beta$=0 does not alter the result; $\beta$>0 emphasizes the regions where $\hat{P}$>0 by making them brighter and the rest darker; and $\beta$<0 has the opposite effect, i.e., it emphasizes the $\hat{P}$<0 regions. The M map may be multiplied pixel-wise to the current result to obtain the final result.

Figure 3:
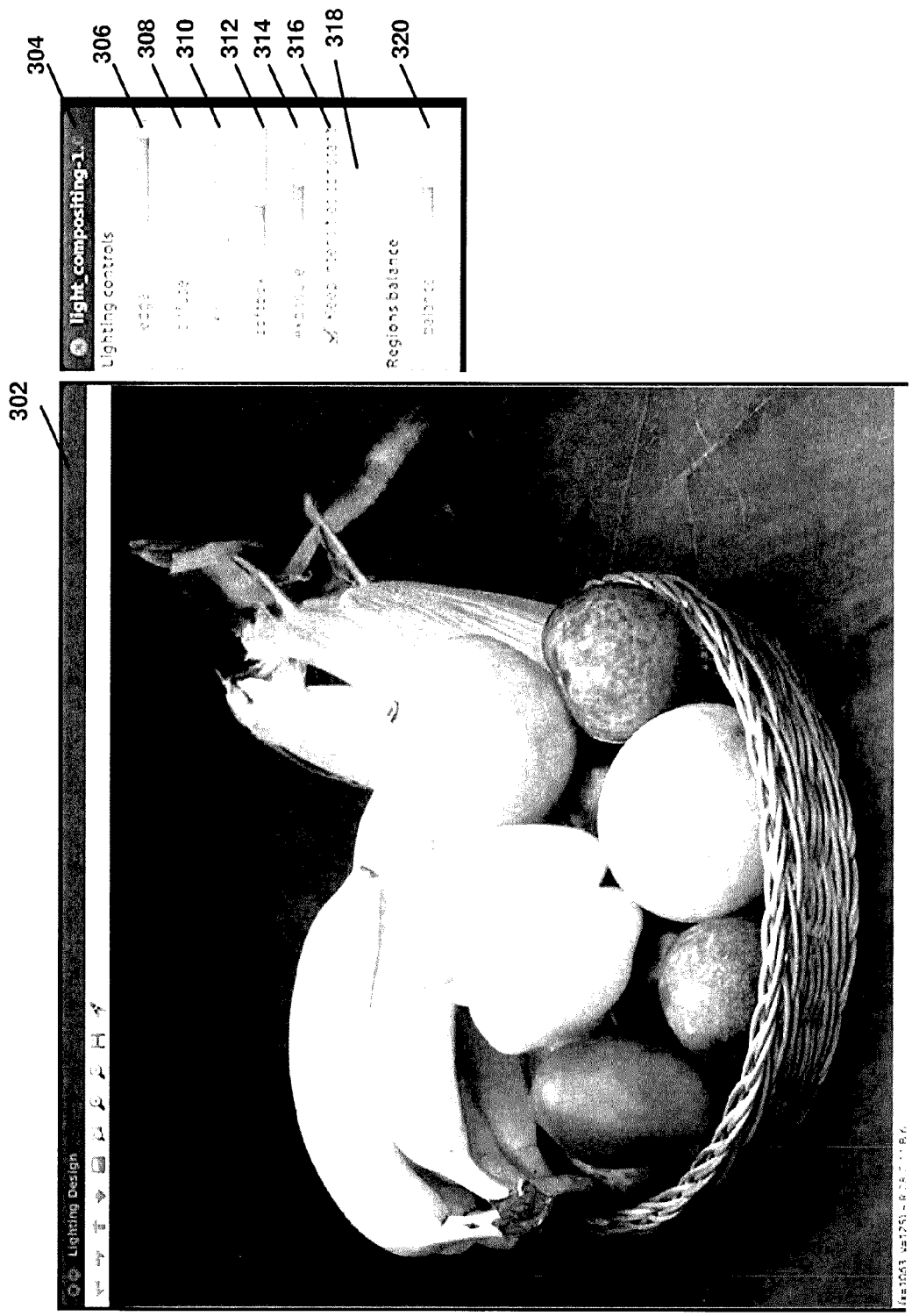
FIG. 3 is a conceptual diagram illustrating an example of a graphical user interface in accordance with one or more techniques of this disclosure.
Figure 4:
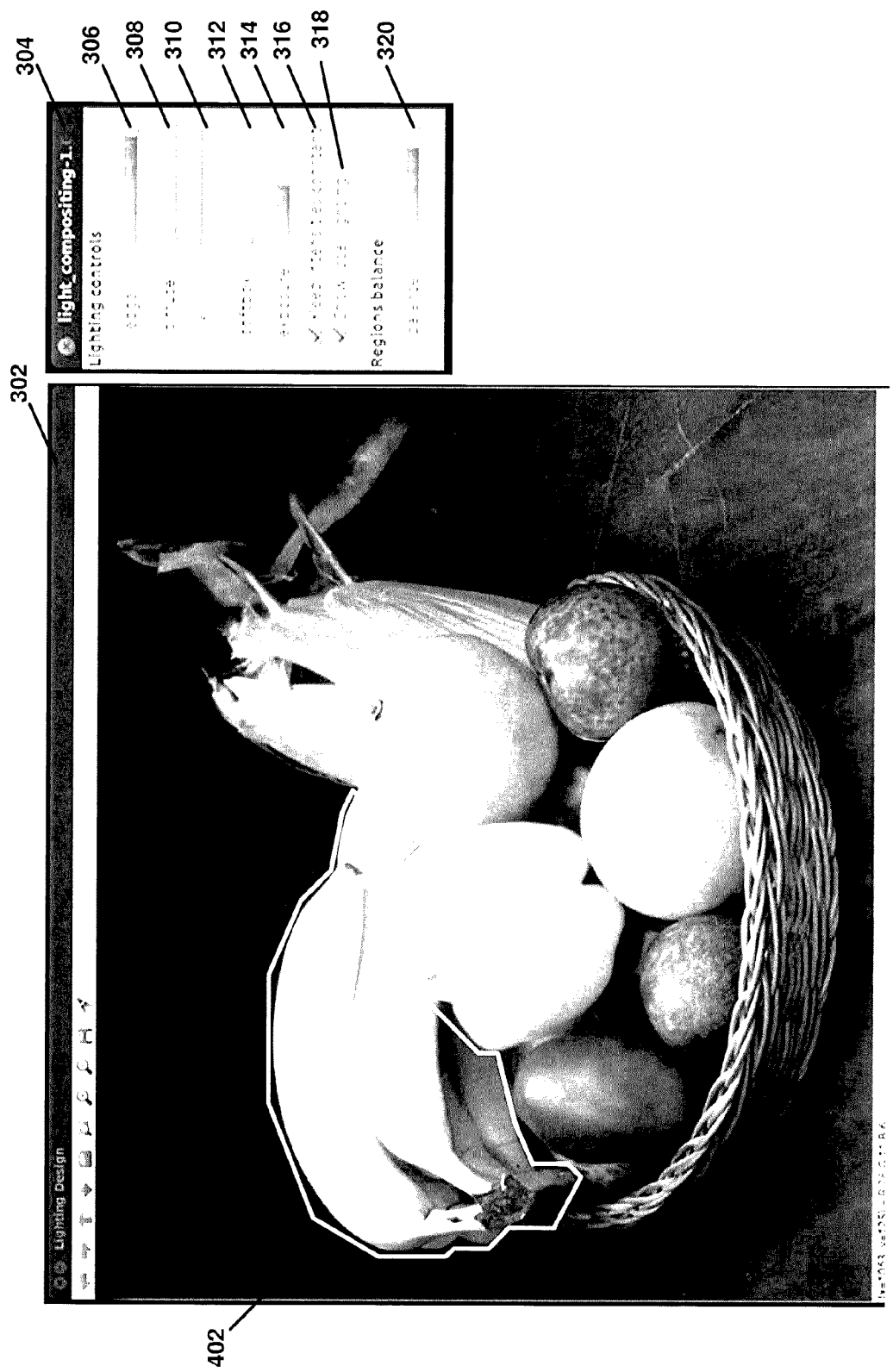
FIG. 4 is a conceptual diagram illustrating an example of a graphical user interface in accordance with one or more techniques of this disclosure.

As described above, the example techniques described herein may be implemented using a graphical user interface that enables a user to create a composite from tens to hundreds of source images from a computational light capture session. FIG. 3 and FIG. 4 are a conceptual diagrams illustrating an example of a graphical user interface in accordance with one or more techniques of this disclosure. As described above, image processing application 216 may be configured to enable a user to create an image based on three basis lights, i.e., fill light, edge light and diffuse color lights, and modifiers, i.e., a per-object lighting modifier, a regional lighting modifier, and a soft lighting modifier. In the examples illustrated in FIGS. 3-4, the example graphical user interface includes an image preview window 302 and a lighting composition control window 304. Image preview window 302 enables users to preview a final image as controls are being modified (e.g., sliders moved). In one example, in order to achieve interactive speeds, image blending may be done on the GPU 211.

Lighting composition control window 304 includes graphical user interfaces controls that enable a user to change a lighting composition. As illustrated in FIGS. 3-4 lighting composition control window 304 includes edge light control slider 306, diffuse light control slider 308, and fill light control slider 310, where each of edge light control slider 306, diffuse light control slider 308, and fill light control slider 310, respectively correspond to basis lights described above and enable control of one or more variables associated with basis lights. As described in detail below, exposure slider 314 and keep intensities constant checkbox 316 provide additional controls for basis lights.

As further illustrated in FIGS. 3-4, lighting composition control window 304 includes softbox control slider 312, show local lighting radio button 318, and regions balance slider 320. As further illustrated in FIG. 4 an object in an image that has been segmented may be indicated by outlining 402. Softbox control slider 312, show local lighting radio button 318, regions balance slider 320, and outlining 402 in combination may correspond to one or more of the modifiers described above and may enable a user to control one or more variables associated with a modifier. The example operation of the graphical user interface illustrated in FIGS. 3 and 4 is described below.

In one example, a user starts from a base image, for example the average of the image stack or a single image from the stack, and then they edit the stack using basis lights and modifiers. The base image may be displayed in image preview window 302 A user may first try to arrive at some globally reasonable solution, and then further refine the scene to identify either objects or parts of the scene that need more attention through edge enhancement, more light, or other lighting effects. In allowing the user to pick individual objects, and applying an optimization of lighting for that particular object, image processing application 312 may introduce inconsistent lighting in a scene. However, this is acceptable based on perceptual research about human insensitivity to lighting inconsistencies.

Referring again to FIGS. 3-4, for every object, the precomputed basis lights (edge, diffuse color, fill) can be mixed by changing their relative contributions with sliders (e.g., edge slider 306, diffuse slider 308, and fill slider 310). Depending on the user's preferences, this can be done in two ways: (1) by preserving the overall intensity using normalized weights that add to one, or (2) by not normalizing. This may be controlled by the checkbox "Keep intensities constant" 316. In addition to that, users can also control a simple exposure slider 314.

For every local object (selected by clicking on the object, and using the checkbox "Show local lighting" 318), the sliders control the object-based lighting. Segmenting the image into regions may be done by a user or an image segmenting technique. When a region is first selected and the local lighting enabled, the initial exposure is set to match that of the global lights. Users can also interactively change the strength of the soft lighting modifier to control the softness of the shadows and highlights, e.g., using softbox slider 312. To ensure a consistent behavior across scenes, the image differences in Equation 7 may be normalized so that the largest one is 1. To enable interactive editing, for each light, the effect of the modifier for 100 regularly spaced values of $\sigma_s$ between 0.01 and 10 may be precomputed. At run-time, the values of the two samples that are closest to the requested parameter may be linearly interpolated. Balance slider 320 controls the regional modifier. This allows users to interactively change the emphasis in the scene, by smoothly modifying the per-pixel exposure, through the parameter $\beta$.

In this manner computing device 200 represents an example of a device configured to receive a plurality of input images, wherein each input image is taken from a fixed viewpoint with a different lighting configuration, select a linear combination of the plurality of input images to determine basis lights elements, and apply one or more basis light elements to one or more input images to create a digital image.

Boyadzhiev evaluates example techniques described herein on several test cases. Boyadzhiev includes sample images that demonstrate the results of applying one or more of the techniques described herein on a range of scenes. For the sake of brevity, the sample images are not reproduced herein, but reference is made to sample images in Boyadzhiev. For example, Boyadzhiev shows example image results for a larger interior scene that has a variety of objects with different shapes and materials; for an indoor room, where an outside view is also visible through a window; an example big outdoor scene; and for fruit image illustrated in FIGS. 3-4. In one example, edge light better reveals the shape of objects, by emphasizing highlights. In one example, diffuse color light shows more of the deep red color of an object. For Boyadzhiev shows that the example systems and techniques described herein may allow novice users to easily explore different lighting designs, by mixing the basis lights in various proportions, globally or per presegmented objects. Boyadzhiev further shows that that even novice users are able to produce nontrivial variations.

Users of the graphical user interfaces illustrated in FIGS. 3-4 can interactively apply the soft lighting modifier to simulate a larger area light source. This can be used to soften the hard shadows on the table, cast by the fruits. The soft lighting modifier can also be used to soften the highlights on the tomato. A fill light can be used to add even illumination to the whole scene, which provides more details in dark regions, including shadows. It should be noted that the difference between the soft lighting modifier and the fill light, is that although at their extreme values they both produce some version of the average image, their intermediate effect is different. The soft lighting modifier simulates a gradual increase of the current light source, by combining nearby lights and weighting them appropriately, whereas the fill light cross fades between the current illumination and the average image.

Boyadzhiev evaluates the dependency of the example systems and techniques described herein on the number and quality of the input images. In Boyadzhiev two tests were conducted based on image selection. In the first test, 5 and then 15 images were randomly selected from an original data set. In the second test, 5 and then 15 images were carefully selected, so that they contain useful features such as lighting that emphasizes the edges, or lighting that reveals the underlying material. The evaluation suggests that a small number of random shots are insufficient to produce good features across all parts of this large scale scene. Second, even if carefully chosen, if the number is too small (e.g., 5) it is not enough for a scene of this of a large size. Finally, post-hoc it was possible to find 15 images that would produce reasonable basis lights. So, it might be possible for a person with a lot of experience to make use of the example basis lights described herein with a smaller number of carefully planned shots. However, even experienced photographers use the earlier work flow (capturing many images) because they are worried they could miss something and do not want to take chances. Further, Boyadzhiev shows that in one example, the quality of a soft lighting modifier is more closely related to the number of input images. The reason is that a more uniform sampling of the lighting in the scene produces more close-by lights. These are needed for the gradual simulation of large area lights, computed by the example soft lighting modifier described herein.

The example approach described herein is a user-driven creation process meant to help users create compelling images. However, it should be noted that not all slider configurations produce such images, e.g., if one uses only the fill light to illuminate the scene, the result will look dull. That said, experiments show that even novice users are able to generate quality results. In general, results do not correspond to a physical setup. For instance, regional lighting and per-object modifiers do not alter the illumination in a physical way. However, they are close to what could be produced using blockers, and example results look plausible. In addition, the core of an example approach described herein is based on linear combinations of the input lights, which corresponds to actually turning on the lights at the same time with the appropriate intensity. This further contributes to generating plausible images.

Finally, image editing software offers virtually infinite control over the result whereas the example approach described herein covers a smaller design space. However, for most users, unbounded editing capability is actually a hindrance more than a help, since it requires advanced skills and a lot of time, which is confirmed by experiments. For the few users with mastery of advanced editing tools, it is envisioned that they would first use the example approach described herein to quickly obtain a satisfying result and, if needed, they would later refine it with standard photo editing software.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for creating a digital image, comprising:
receiving a plurality of input images, wherein each input image is taken from a fixed viewpoint with a different lighting configuration;
selecting a linear combination of the plurality of input images to determine basis lights elements, wherein one or more basis light elements include one or more of:
an edge light element configured to accentuate edges,
a diffuse color light element configured to enhance color,
a fill light element configured to add illumination; and
applying one or more basis light elements to one or more input images to create a digital image.

2. The method of claim 1, further comprising applying one or more modifier control elements to one or more input images to create a revised digital image.

3. The method of claim 2, wherein each of the one or more modifier control elements include one or more of: a per-object lighting modifier element configured to restrict the extent of light in the input image, a regional lighting modifier control element configured to balance the illumination intensity between different regions of a digital image, and a soft lighting modifier configured to control element to produce softer shadows and highlights occurring in input images.

4. The method of claim 3, further comprising enabling a user to change values associated with a modifier control element by manipulating a control.

5. The method of claim 1, wherein each of edge light element, diffuse color light element, and fill light element are associated with a respective energy function.

6. The method of claim 5, further comprising enabling a user to change values associated with a respective energy function by manipulating a control.

7. A device for creating a digital image, comprising one or more processors configured to:
receive a plurality of input images, wherein each input image is taken from a fixed viewpoint with a different lighting configuration;
select a linear combination of the plurality of input images to determine basis lights elements, wherein one or more basis light elements include one or more of:
an edge light element configured to accentuate edges,
a diffuse color light element configured to enhance color,
a fill light element configured to add illumination; and
apply one or more basis light elements to one or more input images to create a digital image.

8. The device of claim 7, wherein the one or more processors are further configured to apply one or more modifier control elements to one or more input images to create a revised digital image.

9. The device of claim 8, wherein each of the one or more modifier control elements include one or more of: a per-object lighting modifier element configured to restrict the extent of light in the input image, a regional lighting modifier control element configured to balance the illumination intensity between different regions of a digital image, and a soft lighting modifier configured to control element to produce softer shadows and highlights occurring in input images.

10. The device of claim 9, wherein the one or more processors are further configured to enable a user to change values associated with a modifier control element by manipulating a control.

11. The device of claim 7, wherein each of edge light element, diffuse color light element, and fill light element are associated with a respective energy function.

12. The device of claim 11, wherein the one or more processors are further configured to enable a user to change values associated with a respective energy function by manipulating a control.

13. A non-transitory computer-readable storage medium comprising instructions stored thereon that upon execution cause one or more processors of a device to:
receive a plurality of input images, wherein each input image is taken from a fixed viewpoint with a different lighting configuration;
select a linear combination of the plurality of input images to determine basis lights elements, wherein one or more basis light elements include one or more of: an edge light element configured to accentuate edges, a diffuse color light element configured to enhance color, and a fill light element configured to add illumination; and
apply one or more basis light elements to one or more input images to create a digital image.

14. The non-transitory computer-readable storage medium of claim 13, wherein the instructions further cause one or more processors to apply one or more modifier control elements to one or more input images to create a revised digital image.

15. The non-transitory computer-readable storage medium of claim 14, wherein each of edge light element, diffuse color light element, and fill light element are associated with a respective energy function.

16. The non-transitory computer-readable storage medium of claim 14, wherein each of the one or more modifier control elements include one or more of: a per-object lighting modifier element configured to restrict the extent of light in the input image, a regional lighting modifier control element configured to balance the illumination intensity between different regions of a digital image, and a soft lighting modifier configured to control element to produce softer shadows and highlights occurring in input images.

17. The non-transitory computer-readable storage medium of claim 16, wherein the instructions further cause one or more processors to: enable a user to change values associated with a basis light element or a modifier control element by manipulating a control.

* * * * *